(12) United States Patent
Platko et al.

(10) Patent No.: US 6,205,509 B1
(45) Date of Patent: Mar. 20, 2001

(54) METHOD FOR IMPROVING INTERRUPT RESPONSE TIME

(75) Inventors: John J. Platko, Acton; Paul Chieffo, Bolton, both of MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/464,263

(22) Filed: Dec. 17, 1999

Related U.S. Application Data

(60) Provisional application No. 60/143,872, filed on Jul. 15, 1999.

(51) Int. Cl.[7] ............................................. G06F 9/48
(52) U.S. Cl. ........................ 710/269; 710/260; 713/400
(58) Field of Search ................................ 710/260, 266, 710/48, 50, 263, 269; 713/400, 502, 600; 340/825.14; 714/12, 724, 731, 742; 702/108, 117

(56) References Cited

U.S. PATENT DOCUMENTS

| | | | |
|---|---|---|---|
| 4,428,044 | * | 1/1984 | Liron . |
| 4,845,752 | * | 7/1989 | Blanc et al. . |
| 4,994,960 | * | 2/1991 | Tuchler et al. . |
| 5,410,710 | * | 4/1995 | Sarangdhar et al. . |
| 5,892,956 | * | 4/1999 | Qureshi et al. . |

* cited by examiner

*Primary Examiner*—Gopal C. Ray
(74) *Attorney, Agent, or Firm*—Weingarten, Schurgin, Gagnebin & Hayes LLP

(57) ABSTRACT

A method and apparatus for rapidly detecting the source of an interrupt. A multi-bit interrupt state register is provided which registers the occurrence of an interrupt in response to an interrupt event. The outputs of the interrupt state register are coupled to an interrupt vector register which is memory mapped and directly accessible to a processor via load and store instructions. The interrupt vector register is continuously updated to reflect the current state of the interrupt state register. The processor may read the interrupt vector register with low latency, store the contents of the interrupt vector register in a general purpose register within the processor, and determine the source of interrupts via bit test instructions performed on the general purpose register. The bits interrupt state register may be cleared by the processor by upon the issuance of a memory mapped write command to a clear register. Writing to the clear register generates clear pulses for selected bits that result in the clearing of the respective bits of the interrupt state register. Additionally, an interrupt status register is provided which the processor can read over a bus. The interrupt status register contains interrupt events which are accessible by the processor with a greater read access latency than the interrupt state register.

14 Claims, 8 Drawing Sheets

METHOD FOR IMPROVING INTERRUPT RESPONSE TIME

CROSS REFERENCE TO RELATED APPLICATIONS

The present application claims priority of U.S. Provisional Application No. 60/143,872, filed: Jul. 15, 1999, titled Sideband Interrupt Status and Acknowledge—A Method for Improving Interrupt Response Time.

STATEMENT REGARDING FEDERALLY SPONSORED RESEARCH OR DEVELOPMENT

N/A

BACKGROUND OF THE INVENTION

The present invention relates to interrupt processing techniques employed within a computer system and more specifically, to a method and apparatus for rapidly identifying the source of an interrupt. In digital systems employing processors, normal program execution is halted to respond to the detection of either an asynchronous or a synchronous event, which may be associated with a peripheral device. Upon the occurrence of such an event, an interrupt signal is generated to provide an indication to the processor that the peripheral device requires service. Typically, the interrupt signals of various peripheral devices are wire OR'd together since the number of interrupt events that may need to be accommodated can exceed the number of interrupt signals that are supported by present processors. Often there are several interrupt signals going directly to the processor, however, even where multiple interrupt signals are employed the interrupt cannot be classified based solely upon the interrupt signal alone. The processor, upon detection of an interrupt via the assertion of an interrupt signal, vectors to an interrupt handler, and, using standard bus accesses, determines the source of the interrupt by testing interrupt bits associated with devices capable of triggering the relevant interrupt signal. After, or during servicing of the interrupt, the processor uses standard bus accesses to clear the source of the interrupt and thereby re-arm the system.

In conventional processing systems, the execution of the above described tasks wastes considerable time in determining the source of the interrupt and later, in clearing the interrupt, due to the number of bus accesses that are required during the interrupt handling process. The overhead is the result of the intrinsic latency of the bus as well as delays incurred in reading and writing buffers, which are electrically situated between the processor and the bus.

It would therefore be desirable to have a technique for determining the source of an interrupt, which avoids the latency, associated with traditional interrupt detection mechanisms.

BRIEF SUMMARY OF THE INVENTION

In accordance with the present invention, a method and apparatus are disclosed for rapidly identifying the source of an interrupt. An interrupt state register containing plural bits receives signals indicative of interrupt events and individual bits of the interrupt state register are set in response to such event signals. Output signals corresponding to individual bits of the interrupt state register are coupled to bits of an interrupt vector register which are synchronized with the clock of a processor. The interrupt vector register is a memory-mapped read/write register, which can be directly read by the processor. Individual bits of the interrupt vector register provide an indication of the occurrence of a given interrupt. The processor may identify the source of the interrupt by reading the interrupt vector register. Plural clear signals are provided which may be asserted under the control of the processor and which, in a preferred embodiment, correspond in number to the number of bits in the interrupt state register. The processor clears selected bits of the interrupt state register by writing to an interrupt clear register. A write to the interrupt clear register by the processor generates a single cycle clock pulse for each asserted data bit in the clear register. The clear pulses are transmitted over a bus and serve to clear the respective bits of the interrupt state register.

To identify the source of the interrupt, bit test instructions are employed after the interrupt vector register is read by the processor and the contents of the interrupt vector register are loaded into a general purpose processor register. Bus cycles associated with the identification of the interrupt source are avoided. Since the interrupt vector register is memory-mapped like data/instruction memory, the processor can issue a read instruction to access the contents of the interrupt vector register. The interrupt state register may also be accessed over a bus, which couples the interrupt state register to the processor.

In addition of the above-referenced state register, a second state register may optionally be provided which is only accessible over the bus. Thus first and second registers are provided for storing interrupt events and a mechanism is provided to permit more rapid access to the contents of the first interrupt state register than the second interrupt state register.

The disclosed technique is particularly advantageous in embedded processor Application Specific Integrated Circuit (ASIC) designs in which the signaling overhead associated with the presently disclosed mechanism does not impose a significant cost or space burden.

BRIEF DESCRIPTION OF THE SEVERAL VIEWS OF THE DRAWING

The invention will be more fully understood by reference to the following Detailed Description of the Invention in conjunction with the drawing of which:

FIG. 6b is a simplified block diagram illustrating an interrupt status register for storing the state of interrupt events not accessible via the interrupt state register of FIG. 6a;

DETAILED DESCRIPTION OF THE INVENTION

A method and apparatus is disclosed which allows a processor to rapidly identify whether any interrupt events have occurred which require service. In one embodiment of the invention, the presently disclosed mechanism is embodied within an Application Specific Integrated Circuit (ASIC) which comprises one component of a Network Interface Card having a PCI bus interface for communicating with a host processor and an Ethernet media access control (MAC) interface for communicating with a network.

Figure 1:
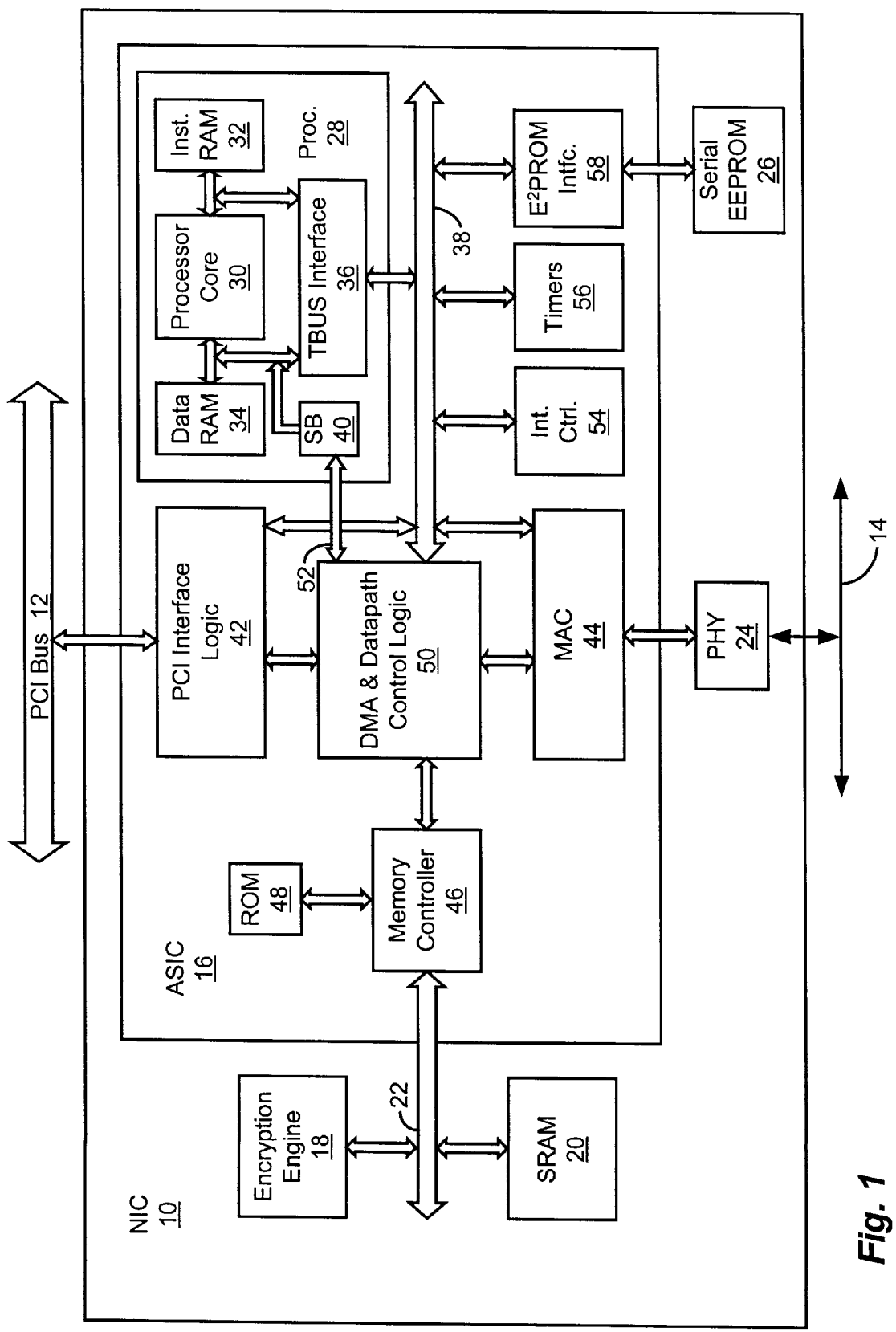
FIG. 1 is a block diagram of a network interface card (NIC)

FIG. 1 shows a block diagram of a network interface card (NIC) 10. As shown, the NIC 10 is intended for connection between a system I/O bus, such as a Peripheral Components Interconnect (PCI) bus 12, and an Ethernet network segment 14. The NIC 10 includes an application-specific integrated circuit (ASIC) 16 having an internal structure described below. The ASIC 16 is connected to static random access memory (SRAM) 20 by a memory bus 22. An optional encryption engine co-processor 18, which in one embodiment can be the so-called Sidewinder IC from VLSI Technology, Inc., of San Jose, Calif., can also be connected to the memory bus 22. The ASIC 16 is also connected to PHY circuitry 24 that implements a physical layer interface to the Ethernet segment 14. An electrically erasable programmable read only memory (EEPROM) 26 is also connected to the ASIC 16.

The ASIC 16 is a highly integrated processing subsystem specially tailored for network interface applications. It includes a processor 28, which in a preferred embodiment employs a processor core 30 known as the ARM9, developed by ARM, Ltd. of Cambridge, England. The processor 28 includes an instruction RAM 32, a data RAM 34, and interface logic 36 for interfacing to an internal data bus 38 referred to as the "T Bus". The processor 28 also contains a 512 byte buffer 40 referred to as a "snoop buffer" or SB, which is described below.

The ASIC 16 also contains PCI interface logic 42 for interfacing to the external PCI bus 12, and media access control (MAC) logic 44 for interfacing to the external PHY logic 24. As shown, the PCI interface logic 42 and MAC logic 44 have connections to the T Bus 38. A memory controller 46 controls the SRAM 20 and the memory bus 22, and also controls access to an on-chip read only memory (ROM) 48. Direct memory access (DMA) and datapath control logic 50 provides connectivity and data movement among the PCI interface logic 42, MAC 44, memory controller 46, and T Bus 38. The DMA and datapath control logic 50 is also connected to the snoop buffer 40 by a separate bus 52. The ASIC 16 also includes interrupt control logic 54, timer logic 56, and E²PROM interface logic 58 connected to the T Bus 38. The E²PROM interface logic provides an interface to the off-chip EEPROM 26.

The T Bus 38 uses separate 32-bit unidirectional buses for data movement to and from connected elements. More specifically, three 32-bit buses carry data from the processor 28 to the PCI interface logic 42, the DMA and datapath control logic 50, and the MAC logic 44 respectively. Also, three 32-bit buses carry data to the processor 28 from respective ones of these logic blocks. The processor 28 is the only "master" on the T Bus 38, meaning that it is the only device that can initiate data transfers. The PCI interface logic 42, the DMA and datapath control logic 50, and the MAC logic 44 all interface to the T Bus 38 as slave devices, as do the interrupt control logic 54, the timer logic 56, and the E²PROM interface logic 58.

The NIC 10 of FIG. 1 operates generally to move packets between the network segment 14 and a host memory that is accessible via the PCI bus 12. All packets either transmitted or received are temporarily buffered in the SRAM 20. The host system communicates with the NIC 10 via data structures referred to as "rings" residing in host memory. Similarly, the processor 28 controls the movement of packets into and out of the SRAM 20 using rings residing in the SRAM 20.

For packets being transmitted, a transmit DMA controller within the DMA and datapath logic 50 is programmed by the processor 28 to obtain a packet and an accompanying packet descriptor from a ring in host memory, and transfer the packet and descriptor to a ring in the SRAM 20. As part of this operation, the DMA controller can load the snoop buffer 40 with data that is being downloaded from the host memory to the SRAM 20. In particular, the DMA controller is programmed to load descriptors into the snoop buffer 40 as they are being transferred from the host into the SRAM 20. This feature enhances performance by enabling the processor to have fast access to descriptors.

Once these items have been transferred to the SRAM 20, the processor 28 examines the descriptor and decides what to do with the packet. Any of a variety of functions may be performed, including for example adding a Virtual Local Area Network (VLAN) tag to the packet, or performing a filtering operation so that only selected packets from the host are sent on the Ethernet segment 14.

For packets to be transmitted to the Ethernet segment 14, the processor 28 builds a new descriptor pointing to the packet data already in the SRAM 20, places the descriptor on a ring in the SRAM 20 used for outgoing packets, and programs a DMA engine within the DMA and datapath logic 50 to transfer the packet to the MAC 44. The MAC 44 transfers the packet data to the PHY circuitry 24, which transmits the packet as a series of bits on the Ethernet segment 14.

For packets received from the Ethernet segment 14, the processing is generally the reverse of that described above. The DMA and datapath logic 50 includes separate receive DMA engines that are responsible for moving packets from the MAC to the SRAM 20, and for moving packets and descriptors between the SRAM 20 and the host memory residing on the PCI bus 12. The processor 28 examines the descriptors of received packets to perform any special processing that may be required and to decide whether the packet is to be passed on to the host. For example, the processor 28 may implement some type of filtering for received packets, so that packets are selectively dropped rather than being forwarded to the host.

Figure 2:
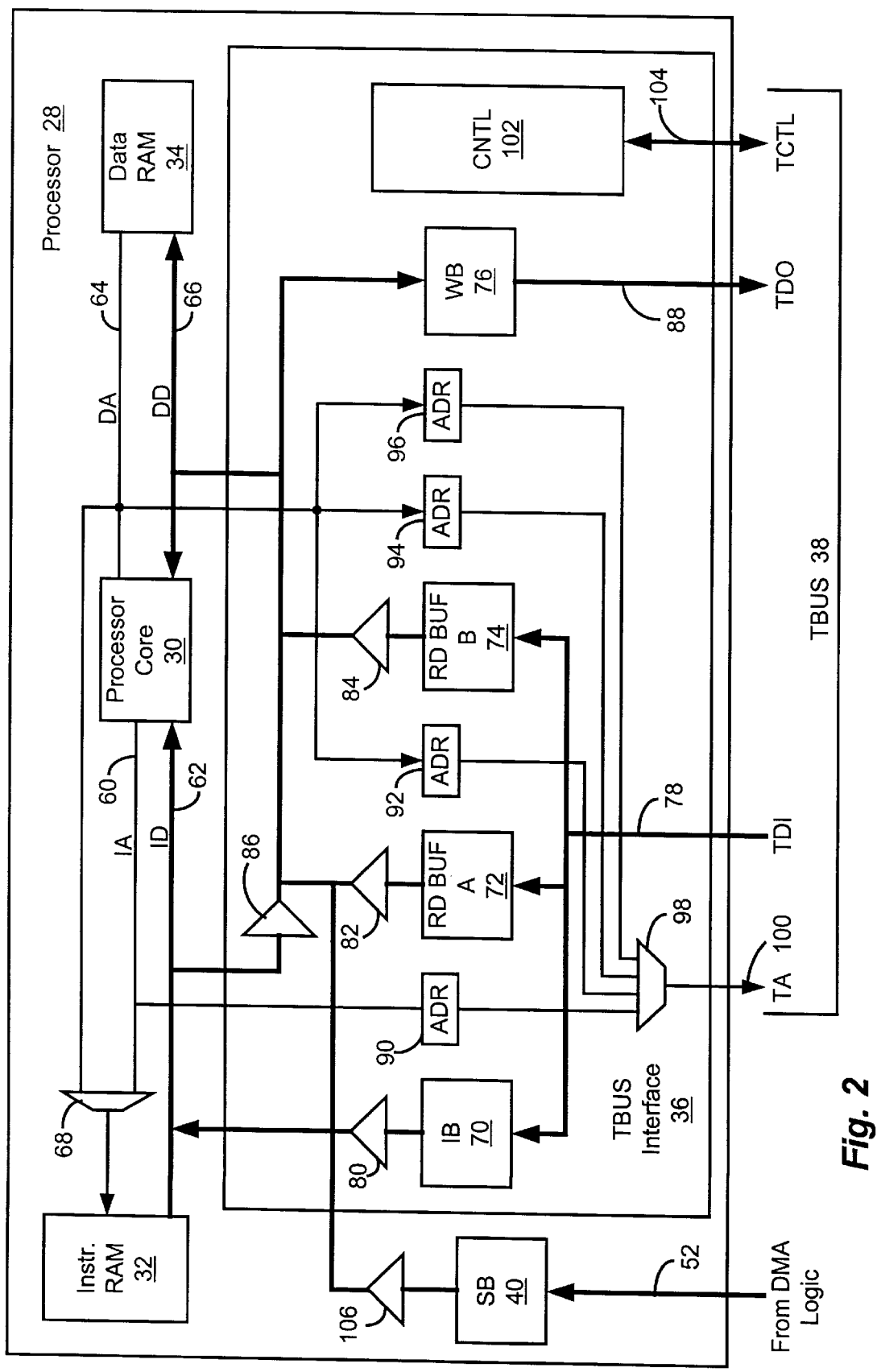
FIG. 2 is a block diagram of the processor in the NIC of FIG. 1.

FIG. 2 shows the processor 28 in more detail. The processor core 30 interfaces with the instruction RAM 32 via an instruction address (IA) bus 60 and an instruction data (ID) bus 62. Also, the processor core 30 interfaces with the data RAM 34 via a data address (DA) bus 64 and a data data (DD) bus 66. The DD bus 66 is connected as a data input to the instruction RAM 32, and a multiplexer 68 is used to select either the IA bus 60 or the DA bus 64 as the source of the address to the instruction RAM 32. This configuration enables the processor core 30 to load operational code into the instruction RAM 32 by performing data store operations into an appropriate address space.

The T Bus interface logic 36 includes an 8-entry instruction prefetch buffer (IB) 70, two 8-word read buffers labeled read buffer A (RD BUF A) 72 and read buffer B (RD BUF B) 74, and a 4-word write buffer (WB) 76. The IB 70 and the read buffers 72 and 74 are loaded from a T Bus Data In (TDI) bus 78. The output of the IB 70 can be selectively driven onto the ID bus 62 via a bus driver 80. The outputs of the read buffers 72 and 74 can be selectively driven onto the DD bus 66 via respective bus drivers 82 and 84. Also, the value on the ID bus 62 can be selectively driven onto the DD bus 66 via a bus driver 86, a function that is used when executing instructions that contain immediate data. The WB 76 is loaded from the DD bus 66, and provides its output to the T Bus 38 on a T Bus Data Out (TDO) Bus 88.

The IB 70, read buffers 72 and 74, and WB 76 have associated address registers 90, 92, 94 and 96 respectively that are used to temporarily store address values when reading or writing data to/from the T Bus 38. As shown, the IB address register 90 is loaded from the IA bus 60, while the remaining three address registers 92, 94 and 96 are loaded from the DA bus 64. The outputs of these address registers are provided as inputs to a multiplexer 98, whose output is provided to the T Bus 38 on a T Bus Address (TA) bus 100. The address register 96 associated with the WB 76 contains multiple storage locations, one for each of the four entries in the WB 76. The address and data from a given store operation advance together through the address register 96 and WB 76 until written to the TBUS 38 as part of a corresponding write transaction.

The T Bus interface logic 36 also contains control logic 102 that controls the movement of data between the T Bus 38 and the various components such as the IB 70, read buffers 72 and 74, WB 76, address registers 90, 92, 94 and 96, and multiplexer 98. This control logic interfaces to the T Bus 38 via various control lines (TCTL) 104. These control lines carry signals such as a clock, a request signal for initiating data transfers, an acknowledge signal for completing transfers, byte enable signals for performing sub-word transfers, and signals indicating whether a transfer is a read or write and whether a single word or a burst of multiple words are involved.

Also shown in FIG. 2 is the snoop buffer 40, which is loaded from the bus 52 from the DMA and datapath logic 50 of FIG. 1. The output of the snoop buffer 40 is selectively driven onto the DD bus 66 via a bus driver 106, so that data from the snoop buffer 40 can be transferred to the data RAM 34 as part of a write transaction.

The T Bus 38 is a synchronous bus capable of byte, half-word, and word read and write operations, as well as 8 word burst read operations. As previously described, the T Bus 38 employs a 31-bit address bus TA(30:0) 100, a 32-bit data input bus TDI(31:0) 78, and a 32-bit data output bus TDO(31:0) 88, where "input" and "output" are defined with respect to the processor 28. The DMA & datapath control logic 50 contains splitter circuitry to split the TDO bus 88 into multiple 32-bit output buses that are routed to different logic units on the T Bus, such as the PCI Interface logic 42, memory controller 46, etc. The DMA and datapath control logic 50 also contains merging circuitry to merge multiple 32-bit input buses from these different logic units into the single TDI bus 78 to the processor 28.

The processor 28 is the only entity that may act as the bus "master", i.e., the initiator of data transaction requests. All other T Bus devices, such as the PCI Interface logic 42, DMA & Datapath control logic 50, etc., operate as "slaves", i.e., responders to requests. The signaling between master and slave during data read and write operations on the T Bus 38 is described below.

The following table shows the complete set of T Bus signals. The column "IN/OUT" indicates whether the signal is an input to or output from the process 28, which is the T Bus master. It will be appreciated that the signals TREQ, TRW, TBE(3:0), TBURST and TACK are included in the set of signals referred to as TCTL 104 in FIG. 2.

| SIGNAL NAME | IN/OUT (MASTER) | DESCRIPTION |
| --- | --- | --- |
| TBCLK | IN | Clock |
| TREQ | OUT | Initiates transfers |
| TRW | OUT | Distinguishes reads from writes: 1 = Read; 0 = Write |
| TBE(3:0) | OUT | Byte Enable signals |
| TBURST | OUT | Distinguishes burst transfers from single-word transfers |
| TACK | IN | Completes transfers |
| TA(30:0) | OUT | Address |
| TDI(31:0) | IN | Data in |
| TDO(31:0) | OUT | Data OUT |

The use of the various T Bus signals is explained below in the description of T Bus read and write transactions.

The signals TBE(3:0) are used to carry out half-word and byte-length T Bus operations in response to instructions executed by the processor core 30. The processor core 30 generates a 2-bit signal BSize(1:0) indicating whether a word, half-word, or byte operation is being performed. The T Bus interface logic 36 generates the TBE(3:0) signals in response to the value of BSize(1:0), as described below. In addition, the T Bus Interface logic 36 supports both little-endian addressing and big-endian addressing. The following table shows the relationship among the endianness, the BSize(1:0) signals, the lowest two bits of the address generated by the processor, and TBE(3:0):

| BSize(1:0) | Address(1:0) | TBE(3:0) Big-endian | TBE(3:0) Little-endian |
| --- | --- | --- | --- |
| 10 (word) | xx | 1111 | 1111 |
| 01 (½ word) | 0x | 1100 | 0011 |
| 01 (½ word) | 1x | 0011 | 1100 |
| 00 (byte) | 00 | 1000 | 0001 |
| 00 (byte) | 01 | 0100 | 0010 |
| 00 (byte) | 10 | 0010 | 0100 |
| 00 (byte) | 11 | 0001 | 1000 |

'x' = don't care

When a given bit in TBE(3:0) is set to 1, it indicates that a corresponding byte in TDI or TDO is included in the operation. TBE(3) corresponds to the byte formed by data bits (31:24); TBE(2) corresponds to the byte formed by bits (23:16); TBE(1) corresponds to the byte formed by bits (15:8); and TBE(0) corresponds to the byte formed by bits (7:0).

Figure 3:
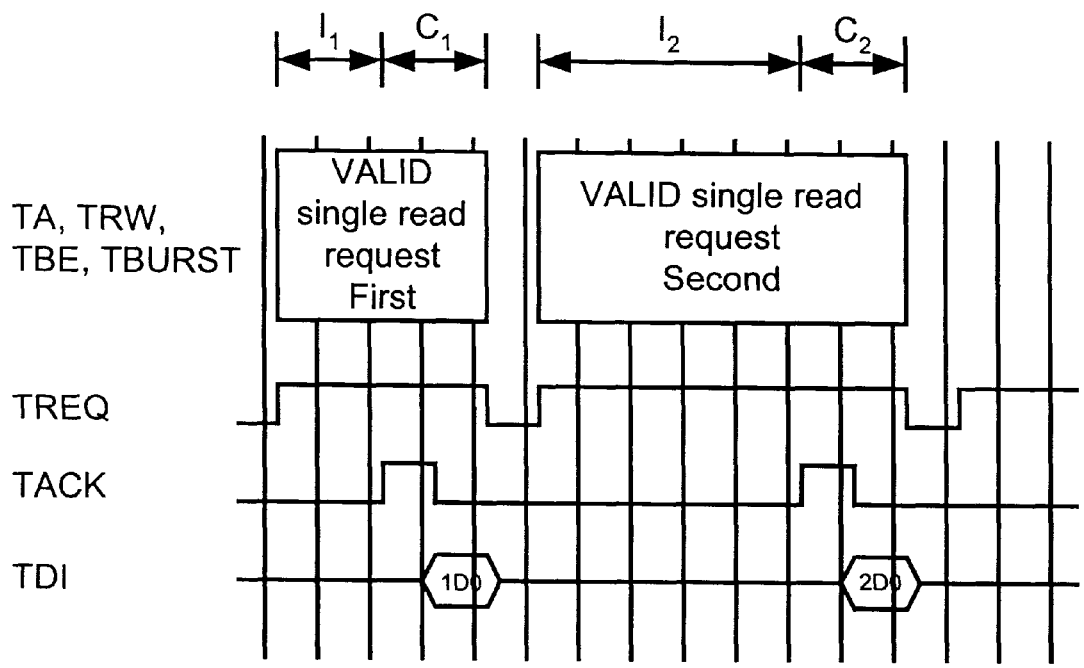
FIGS. 3–5 are timing diagrams showing the operation of a bus in the NIC of FIG. 1 referred to herein as the T Bus.

FIG. 3 shows a single-word (or smaller) T Bus read transaction followed by a second single-word read transaction. As shown, each transaction includes an initial phase I and a completion phase C. The initial phase I begins upon assertion of the TREQ signal. At this time, the signals TA, TRW, TBE, and TBURST are also asserted by the processor 28 as bus master; these signals remain asserted throughout the transaction as shown. The initial phase I ends, and the completion phase C begins, upon assertion of the TACK signal by the responding slave. For the single-word read as well as other transactions described below, the following timing requirements must be met:

1. TACK may be asserted no earlier than 1 cycle after assertion of TREQ (in FIG. 3 this time is 2 cycles);
2. TACK lasts exactly one cycle;
3. TREQ and the other control signals (including the address TA) must be held until exactly one cycle after deassertion of TACK; and 4. TREQ must be deasserted for at least one cycle between successive transactions.

Additionally, there is predetermined timing between the assertion of TACK and the data. For single-cycle reads, the data is returned in the cycle following the assertion of TACK. The data timing for burst reads and for writes is indicated below.

Figure 4:
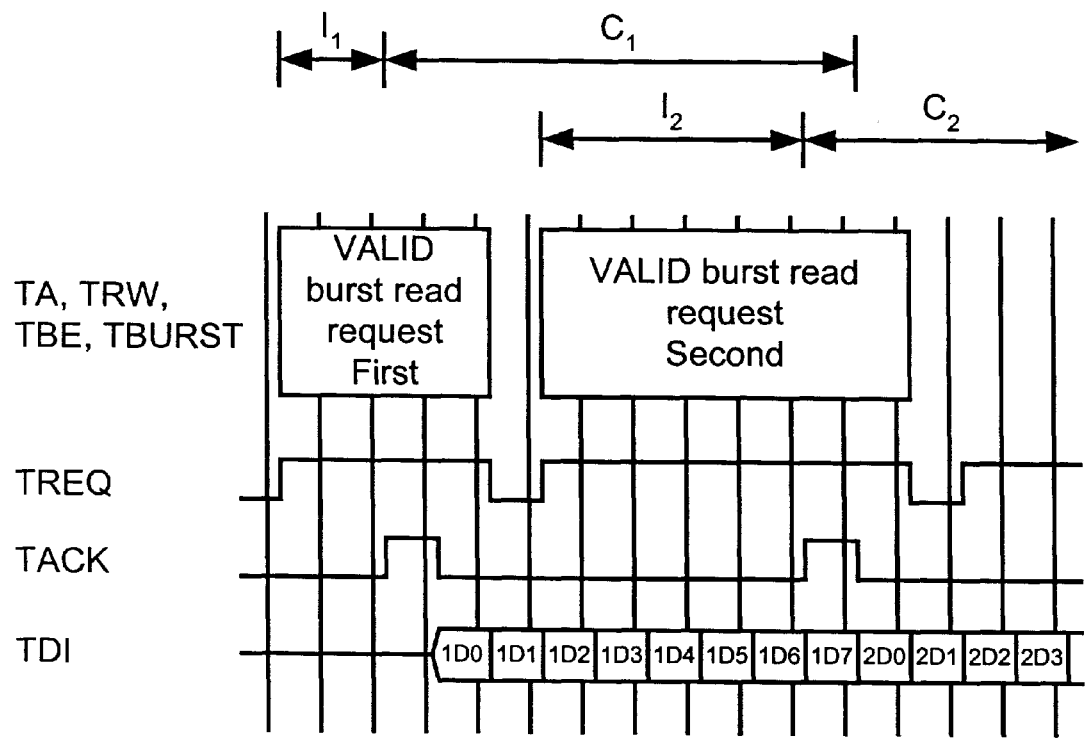

FIG. 4 shows a single-word read followed by a burst read. In this scenario, the $1^{st}$ burst read transaction is overlapped with the next transaction in a pipelined fashion, advantageously reducing the access time for the $2^{nd}$ read and thereby achieve improved performance. As shown in FIG. 4, the first read is not complete until the requested 8 data words have been returned. However, 2 cycles after TACK has been asserted for the first read, the initial phase $I_2$ for the $2^{nd}$ read transaction begins. The $2^{nd}$ transaction enters the completion phase one cycle before the end of the completion phase for transaction #1. Regarding the data timing, for a burst read the $1^{st}$ data word is returned in the cycle following the assertion of TACK, and the remaining data words are returned in the 7 succeeding cycles.

Figure 5:
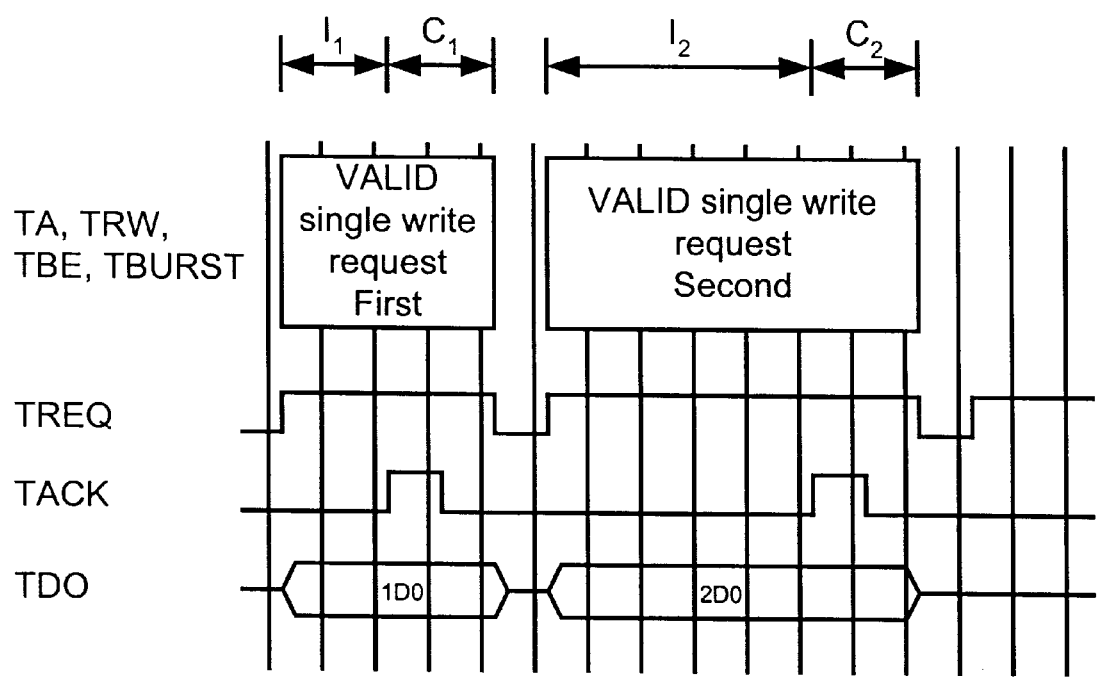

FIG. 5 shows a sequence of two single-cycle writes. The processor 28 as T Bus master asserts the data output bus TDO upon assertion of TREQ, and holds the value on TDO throughout the transaction.

Referring to FIGS. 1, 2 6a, and 6b the ASIC 16 further includes a mechanism to reduce the time in which to identify the source of an interrupt. Interrupt events which may need to be serviced are divided into two categories; those interrupt events which need to be identified rapidly and those events which do not need to be identified as rapidly. The interrupt events which need to be identified rapidly are coupled as inputs to an interrupt state register 200 which, in the present embodiment, comprises a 32-bit register comprising 32 bistable registers Intstate[0] through IntState[31]. The interrupt state register 200 stores the state of individual interrupt bits which are received from their respective sources. These bits are set by hardware events and are readable by the processor core 30 of FIG. 2 as subsequently described. These bits may also be cleared under the control of the processor core 30 as discussed below.

Figure 6A:
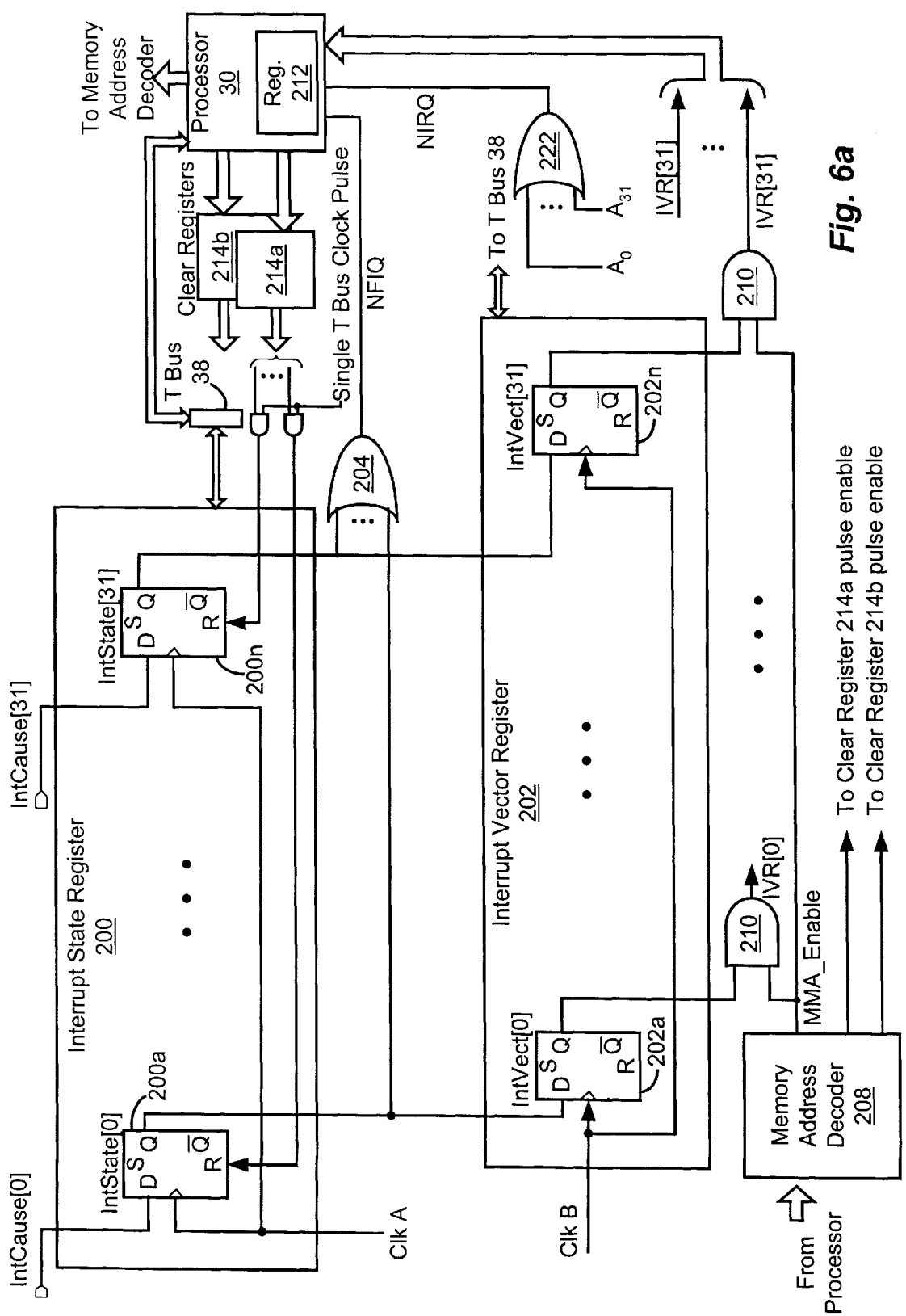
FIG. 6a is a simplified block diagram of apparatus for rapidly identifying the source of an interrupt in accordance with the present invention.

Signals IntCause[0] through IntCause[31], are asserted when the respective interrupt event requires service, and are coupled to the inputs of the interrupt state register 200. The signals IntCause[0] through IntCause[31] may be coupled to the D inputs of the respective bistable registers 200a–200n, as shown, or alternatively, may be coupled to the set inputs of the respective registers. In the presently described embodiment, the interrupt state register 200 is clocked with a clock signal (Clk A in FIG. 6a) which is synchronized to the T Bus 38 clock. The interrupt events which generate the IntCause signals may be interrupt events well known in the art or any other interrupt events requiring service. The outputs of the interrupt state register 200 are coupled to the inputs of an interrupt vector register 202 which comprises a plurality of bistable registers 202a–202n as depicted in FIG. 6a. The outputs of the interrupt state vector 200 are also coupled to a wide OR gate 204. The wide OR gate 204 (shown logically) may be implemented as a series of chained two input OR gates with the output of each OR gate coupled to an input of the next downstream OR gate. In this chained configuration two of the outputs of the interrupt state register 200 are coupled to the most upstream OR gate in the chain and another output of the interrupt state register 200 is coupled to each subsequent OR gate in the chain. Thus, upon the setting of any one or more of the bistable registers 200a–200n, the output of the wide OR gate 204 produces an output signal NFIQ indicative of the occurrence of an interrupt that requires service. The NFIQ signal produced by the OR gate 204 is coupled to the processor core 30 to signal the processor core 30 of the occurrence of an interrupt.

The interrupt vector register 202 is clocked with a clock (Clk B) which is synchronized to the processor core 30. Thus, the interrupt state register 200 is synchronized to the T Bus clock and the data contained within the interrupt state register 200 is resynchronized to the processor core 30 clock via the interrupt vector register 202. The interrupt vector register 202 is continously clocked by Clk B and thus continuously tracks the contents of the interrupt state register 200 delayed only by the latency associated with the resynchronization.

The interrupt vector register 202 is a memory mapped register which may be directly read by the processor core 30 using conventional load and store instructions. In this manner, the interrupt vector register 202 may be read upon the detection by the processor core 30 of the assertion of the NFIQ signal with minimal latency.

More specifically, a predetermined address within the processor core 30 address space is associated with the interrupt vector register 202. Upon the assertion of the NFIQ signal, the processor core 30 detects the NFIQ signal assertion and reads the contents of the interrupt vector register 202 by issuing a read of the interrupt vector register 202 at the predetermined address. A memory address decoder 208 decodes the predetermined address provided by the processor core 30 in the read instruction and produces an enable output signal (MMA_Enable) which is coupled to one input of AND gates 210. The respective outputs of the interrupt vector register 202 are coupled to other inputs of the AND gates 210 as shown. The AND gates 210 produce outputs IVR[0]–IVR[31] which are coupled to the processor core 30. By clocking the contents of the interrupt state register 200 into the memory mapped interrupt vector register 202, the interrupt vector register 202 may be directly read via a memory mapped read instruction.

When the processor core 30 detects the assertion of the NFIQ signal indicative of the occurrence of an interrupt event requiring rapid service, the processor core 30 reads the interrupt vector register 202 as discussed above and stores the contents of the interrupt vector register 202 into a general purpose register 212 associated with the processor core 30. The processor core 30 then performs bit test instructions on the contents of the general-purpose register 212 to ascertain which bit or bits have been set. In this manner, the specific interrupt event requiring service is rapidly identified without the overhead associated with transfers over the T Bus 38.

The individual bits of the interrupt state register 200 may be cleared and interrupt acknowledgement signals generated under the control of the processor core 30. To clear selected bits of the interrupt state register 200 or generate an acknowledgement signal, the processor core 30 writes a data word to a clear register 214 via a memory mapped write instruction. The address of the write comprises a predetermined address within the address space of the processor core 30. When a write is performed to the clear register 214a at the predetermined memory mapped write address, the address decoder 208 decodes the address and generates an enable signal. Clear bits are written to the clear register 214a and clear pulses are coupled to respective inputs of the interrupt state register 200 in response to the assertion of the clear register enable signal from the address decoder 208. More specifically, the bits of the clear register 214 are employed to generate respective clear pulses which, in the present embodiment, are each the width of a single T Bus clock pulse and which are coupled to the respective reset inputs of the interrupt state register 200. Selected outputs of the clear register may also comprise acknowledgement signals as later discussed.

In the foregoing manner, the processor may clear the interrupt state register 200 and thus re-arm the respective bits of the interrupt state register 200 to permit detection of a subsequent interrupt event and provide acknowledgements to interrupt events.

The interrupt state register 200 is coupled to the T Bus 38 and may be accessed over the T bus 38 (see FIG. 2) to allow the various bits of this register to be set and reset via T Bus 38 read and write instructions. It should be noted that when the interrupt state register 200 is read over the T bus 38, increased latency will be experienced when compared to the latency associated with a read of the interrupt vector register 202 by the processor core 30.

Figure 6B:
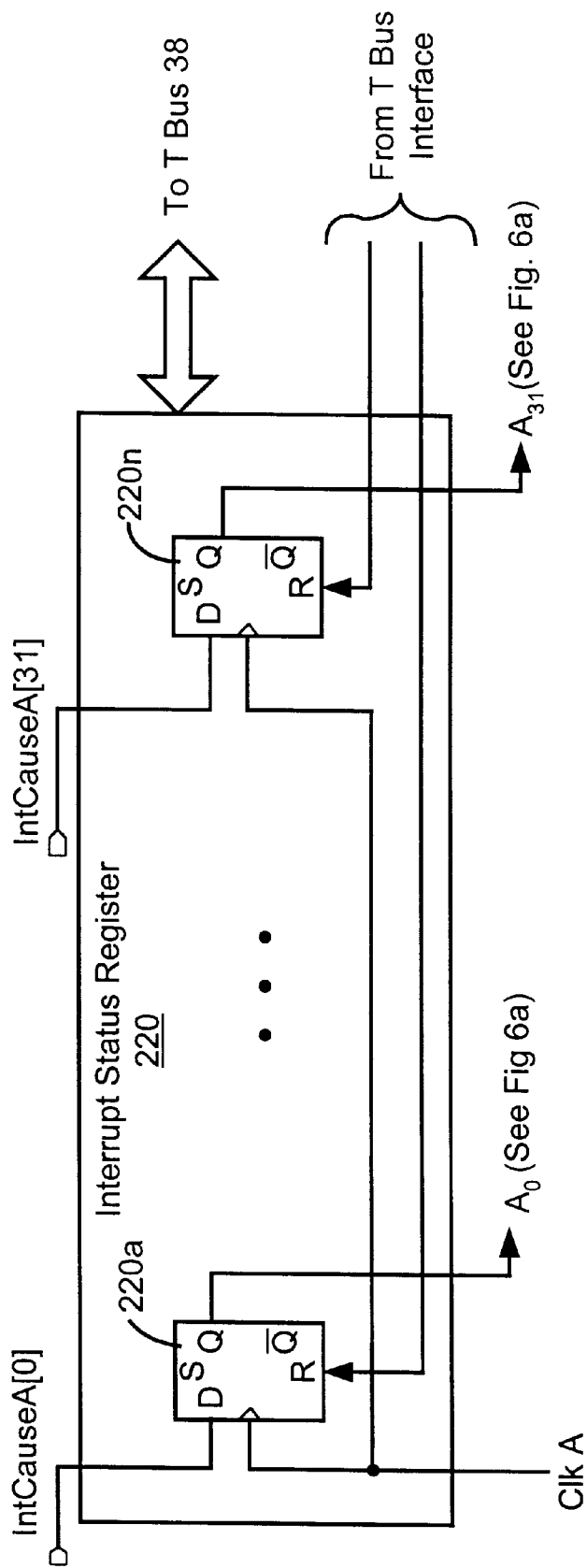

An interrupt status register 220, depicted in FIG. 6b, also maintains the state of a plurality of interrupt events. The interrupt status register 220, like the interrupt state register 200 is composed of a plurality of bistable registers which are synchronized to the T Bus 38 clock. The outputs of the interrupt status register 220 may be read by the processor core 30 over the T Bus 38 and cleared via writes to the interrupt status register 220 over the T Bus 38 via read and write instructions issued by the processor to specific memory mapped addresses associated with the respective registers. The interrupt status register 220 may optionally have individual bits cleared and acknowledges provided via a memory mapped write instruction from the processor core 30 to a clear register 214b as described above in connection with clear register 214a at a unique memory address to permit more rapid clearing of selected bits of the interrupt status register 220. However, since the interrupt status register 220 is not coupled to an interrupt vector register which may be accessed via a memory mapped read instruction, it is not possible to determine the source of interrupts recorded in the interrupt status register 220 with as low a read access latency as interrupt events recorded within the interrupt state register 200 and clocked into the interrupt vector register 202. The outputs of the interrupt status register 220 are coupled to the inputs of a wide OR gate 222 which produces an NIRQ signal. While the OR gate 222 is logically depicted as a wide OR gate, as discussed above with respect to OR gate 204, it should be appreciated that the OR gate 222 may be implemented as a series of chained 2 input OR gates wherein the output of each gate comprises an input to the next OR gate in the chain. The outputs of the interrupt status register 220 are coupled to the 2nd input of the respective OR gate with two outputs of the interrupt status register coupled to the most upstream OR gate in the chain. The NIRQ signal is coupled to the processor core 30 and signals to the processor that an interrupt event has occurred of the type recorded within the interrupt status register 220. The T Bus 38 interface employed to read and clear the interrupt status register 220 is described hereinabove.

Figure 7A:
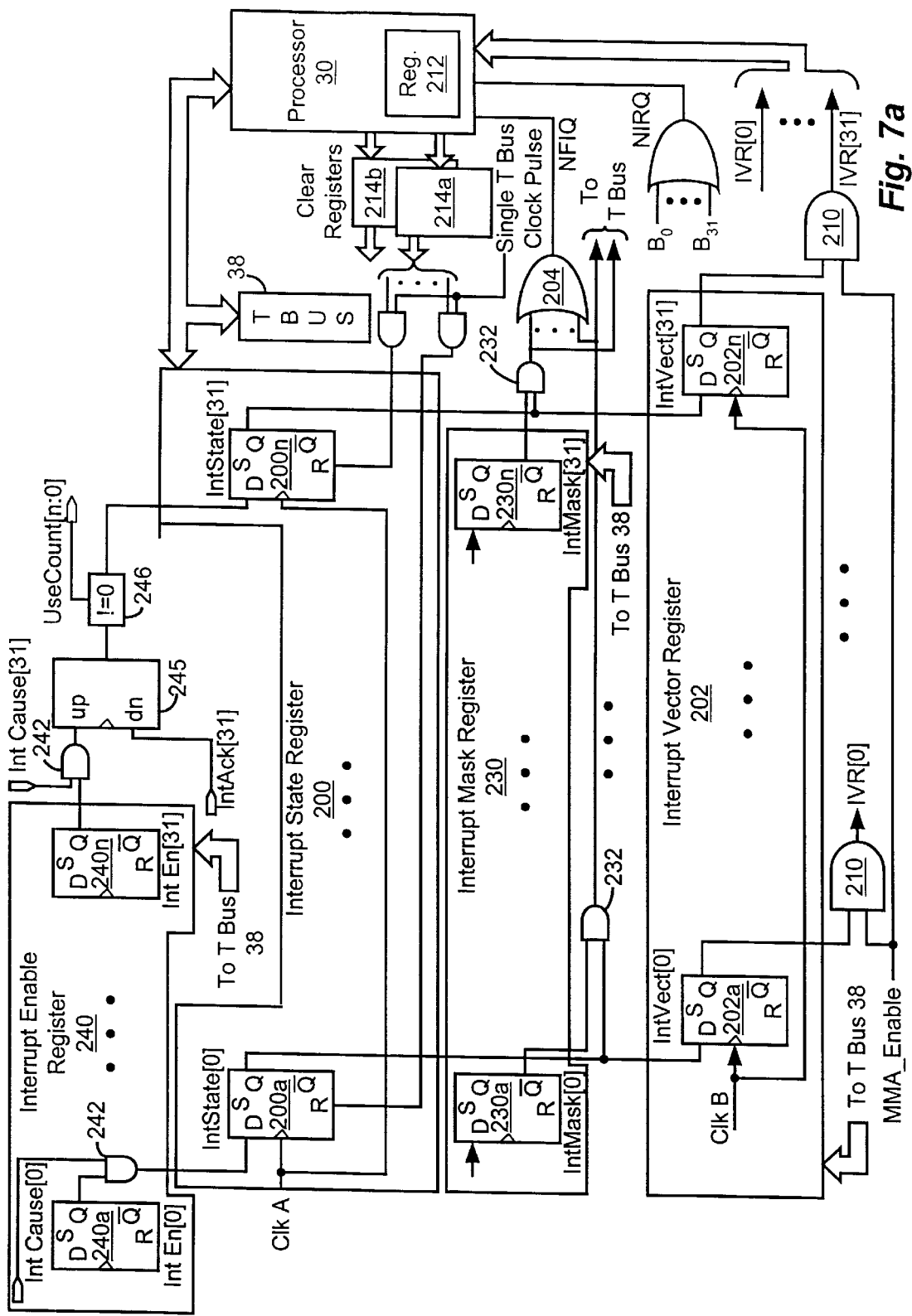
FIG. 7a is a more detailed block diagram of the apparatus of FIG. 6a further illustrating apparatus for enabling and masking interrupt events.
Figure 7B:
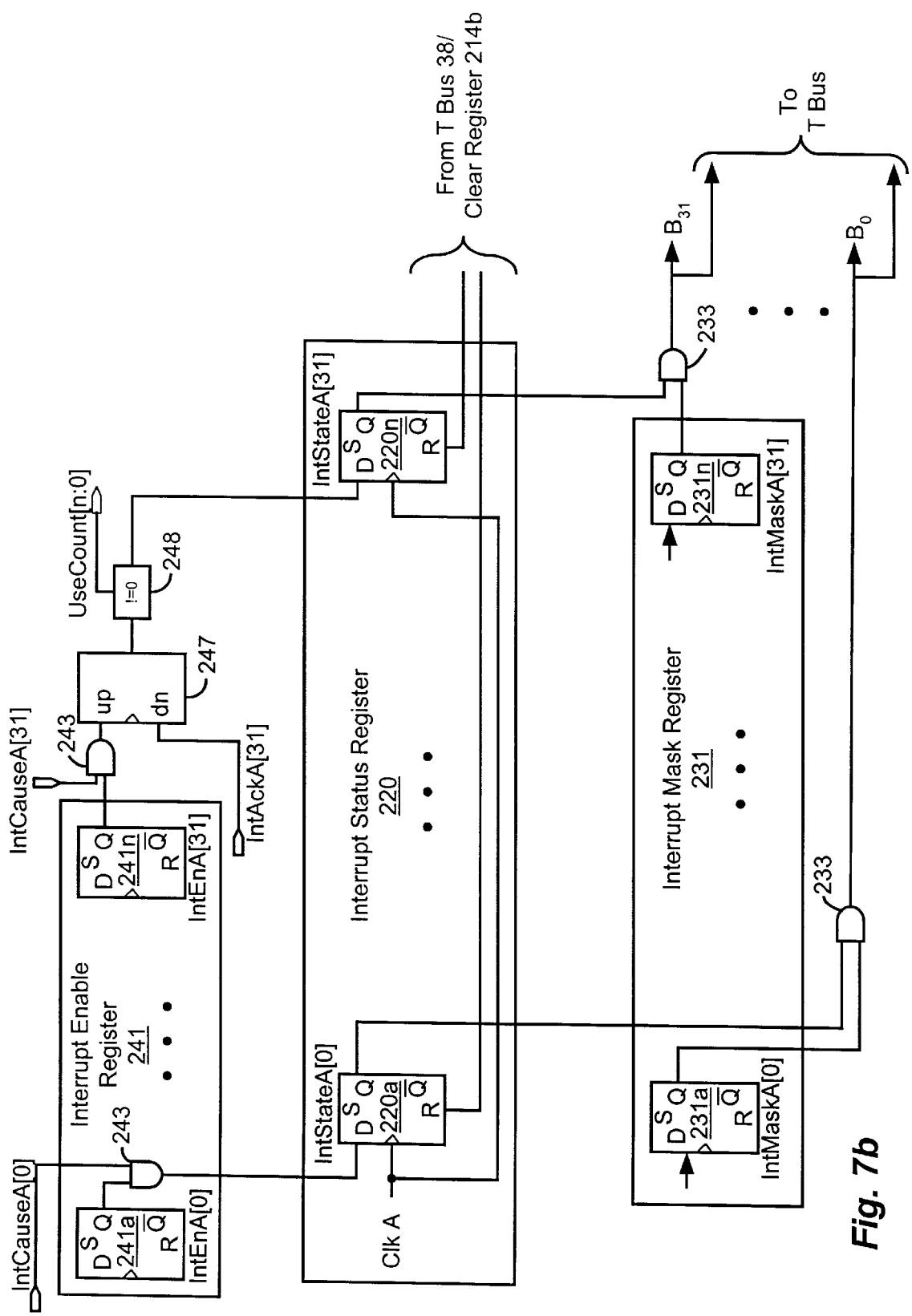
FIG. 7b is a more detailed block diagram of the apparatus of FIG. 6b illustrating logic for enabling and masking interrupt events.

FIGS. 7a and 7b illustrate an interrupt state register 200 and an interrupt status register 220 which operate generally as described above with respect to FIGS. 6a and 6b however interrupt enable registers 240 and 241 and interrupt mask registers 230 and 231 are included to allow for enabling and masking of interrupts associated with the interrupt state register 200 and the interrupt status register 220 respectively. More specifically, referring to FIG. 7a a signal associated with each interrupt event (IntCause[0]–IntCause[31]) is coupled to one input of a corresponding AND gate 242. The other inputs of the respective AND gates 242 are coupled to the outputs of a corresponding interrupt enable bistable register (240a–240n). In the event the respective bistable enable register (240–240n) is set, the output of the corresponding AND gate 242 is asserted when the respective interrupt event is asserted. The respective bistable register 200a–200n within the interrupt state register 200 is set upon the next occurrence of interrupt state register 200 clock (Clk A). Alternatively, the output of the respective AND gates 242 may be applied to the set terminal of the respective bistable register within the interrupt state register 200 to set the respective bit within the interrupt state register 200. Further, a use counter may be imposed between the respective IntCause signal (e.g. IntCause[31]) and the respective bistable register of the interrupt state register (e.g. IntState [31]). As illustrated in FIG. 7a, the IntCause[31] signal and the output of the bistable register 240n of the interrupt enable register 240 are coupled to the inputs of an AND gate 242. The output of the AND gate 242 is coupled to the input of a use counter 245 such that the use counter is incremented upon each assertion of the IntCause[31] signal when the interrupt enable register 240n is enabled. The use counter 245 is decremented in response to the assertion of the IntAck[31] signal from the clear register. It is noted that multiple memory mapped clear registers may be employed to provide sufficient numbers of clear and acknowledge signals. Each clear register 214 is responsive to a unique memory address. The output of the use counter 245 is coupled to a comparator 246. The comparator 246 asserts an output signal when the counter value equals an input value UseCount[n:0]. The output of the comparator 246 is coupled to the input of the bistable register 200n. Thus, when a use counter is employed, an interrupt event is signalled to the processor core 30 as long as the use counter 245 contains a non-zero value.

Thus, if the respective bistable register within the interrupt enable register 240 is not set for a particular bit, the interrupt state register 200 cannot be set irrespective of the occurrence of an interrupt event and the use counter cannot be incremented.

An interrupt mask register 230 is also provided which, in a preferred embodiment, includes a plurality of bistable registers 230a to 230n. When an interrupt bit is masked but enabled, the interrupt event is recorded in the interrupt state register 200 however, the masked bit cannot signal an interrupt event to the processor core 30 over the NFIQ line. More specifically, the inverted Q output of each bistable register 230a to 230n within the interrupt mask register 230 is coupled to one input of a corresponding AND gate 232. The output of the corresponding bit of the interrupt state register 200 is coupled to the other input of the respective AND gate 232. If the inverted Q output of the respective bistable register 230 to 230n of the interrupt mask register 230 is low, the output of the AND gate 232 remains deasserted and cannot result in the assertion of the NFIQ signal via OR gate 204. Thus, when a particular bit of the interrupt state register 200 is enabled but masked, the respective bit within the interrupt state register 200 can be set and may be read over the T Bus 38, however the occurrence of an interrupt event is not signaled to the processor core 30 via the NFIQ signal and cannot activate an interrupt. When a particular bit of the interrupt state register 200 is enabled and not masked, the respective bit within the interrupt state register 200 can be set and an interrupt event signaled to the processor core 30 via the NFIQ signal.

The processor core 30 may acknowledge the detection of an interrupt in a number of ways. First, the processor core 30 can write to the interrupt state register 200 over the T Bus. Second, the processor core 30 can write to the memory mapped clear register 214 as described above. A signal line is provided from an output of each bit of the clear register(s) 214 to a corresponding bit of the interrupt state register 200 or the acknowledgement signal input (as applicable). Writing a 1 to the clear register 214a causes the corresponding bit of the interrupt state register 200 to be reset (or a use counter decremented). Finally, the processor core 30 may read an alias of the interrupt state register 200 referred to herein as the interrupt auto state register (not shown). In the case of a read from the auto interrupt state register, each active interrupt is automatically acknowledged. It is noted however that no acknowledge is provided for read-only bits within the interrupt state register 200.

Referring to FIG. 7b, an interrupt status register 220 is depicted along with an interrupt enable register 241 and an interrupt mask register 231. As discussed above with respect to FIG. 7a. The interrupt enable register 241 and the interrupt mask register 231 permit the disabling and masking of interrupt events as discussed with respect to the enable and mask registers 240 and 230 depicted in FIG. 7a.

As discussed above with respect to FIG. 6b, the interrupt status register 220 outputs are coupled to an OR gate 222 which generates the NIRQ interrupt signal(see FIG. 7a). The interrupt status register 220 however, may only be read via read instructions from the processor core 30 over the T Bus 38. The interrupt status register 220 may be cleared via write instructions over the T Bus 38 issued by the processor core 30 or alternatively, via a memory mapped write instruction to the clear register 214b. Accordingly, interrupt events that require low latency service are coupled to the interrupt state register 200 inputs rather than the interrupt status register 220 inputs.

As depicted in FIG. 7b a use counter 247 is employed to permit an interrupt event to be signalled to the processor core 30 as long as the use counter 247 contains a non-zero value. The interrupt event IntCauseA[31] associated with the respective bit causes the use counter 247 to increment. A predetermined non-zero counter value detected by the comparator 248 allows the respective bit of the interrupt status register 220 to be set. The interrupt acknowledge signal (IntAckA[31]) is generated either by a write command issued over the T Bus 38 or, in a preferred embodiment via a memory mapped write to the clear register 214. The IntAckA[31] signal decrements the use counter 247. In one embodiment, the use counter 247 may be cleared or read by the processor core 30 over the T Bus 38.

The processor core 30, upon detection of an interrupt via the NFIQ signal, reads the interrupt vector register 202 over from outputs IVR[0]–IVR[31] and stores the contents of the interrupt vector register 202 into a general purpose register 212 associated with the processor core 30. The processor core 30 then performs bit test instructions on the general purpose register 212 to ascertain which locations of the interrupt vector register 202 are asserted. Once the processor ascertain which bit or bits of the interrupt vector register is/are set, the processor core 30 invokes execution of the interrupt handler(s) associated with the respective interrupt event(s).

The interrupt state and status registers 200, 220 and the interrupt mask registers 230, 231 and the interrupt enable registers 240, 241 may all be accessed read via write and read instructions issued over the T Bus 38 via the processor core 30.

It should be noted that certain bistable registers within the interrupt state register 200 and the interrupt status register 220 may be read only. Bits of such registers that are read-only are cleared at the source of the interrupt event. Once the interrupt event signal is cleared at the source, such propagates to the interrupt state register 200 and to the interrupt vector register 202 in the case of interrupt events coupled to the interrupt state register 200. Similarly, once the source of an interrupt event is cleared for an interrupt event that is coupled to the interrupt status register 220, such propagates to the interrupt status register 220.

It should be appreciated by those of ordinary skill in the art that variations of and modifications to the above described methods and apparatus for providing low latency detection of an interrupt event may be made without departing from the inventive concepts disclosed herein. Accordingly, the invention should be viewed as limited solely by the scope and spirit of the appended claims.

What is claimed is:

1. Apparatus for allowing a processor to rapidly identify the source of an interrupt comprising:

a first interrupt state register having a first plurality of locations for storing data representative of a corresponding first plurality of interrupt events, said first interrupt state register having a corresponding plurality of first interrupt state register outputs;

an interrupt vector register clocked by a clock synchronized with said processor, said interrupt vector register having a plurality of locations for storing said data representative of said plurality of interrupt events and having interrupt vector register inputs coupled to predetermined ones of said first interrupt state register outputs, said interrupt vector register having outputs in electrical communication with said processor; and said interrupt vector register outputs being readable by said processor in response to the issuance of a first predetermined read instruction from said processor.

2. The apparatus of claim 1 further including first interrupt signaling logic operative to provide a first indication to said processor in the event of the storage within said first interrupt state register of data representative of at least one interrupt event.

3. The apparatus of claim 1 further including:

a first clear register having a plurality of inputs in selective electrical communication with said processor and a plurality of outputs; and said first clear register being operative to generate clear register output signals on selected ones of said first clear register outputs to reset selected bits within said first interrupt state register in response to the writing of a data word from said processor to said first clear register.

4. The apparatus of claim 3 further comprising:

a second interrupt state register having a second plurality of locations for storing data representative of a corresponding second plurality of interrupt events, said second interrupt state register having a corresponding second plurality of second interrupt state register outputs;

second interrupt signaling logic operative to provide an indication to said processor in the event of the storage within said second state register of data representative of at least one second interrupt event;

a bus, said bus selectively coupling said second interrupt state register outputs to said processor, said second interrupt state register being operative to forward the contents of said second interrupt state register over said bus to said processor subsequent to detection by said processor of said indication of said at least one second interrupt event in response to a second predetermined read instruction issued by said processor; and said interrupt vector register having a lower read access latency than said second interrupt state register in response to respective first and second predetermined read instructions issued by said processor.

5. The apparatus of claim 4 further including a second clear register having a plurality of inputs in selective electrical communication with said processor and a corresponding plurality of second clear register outputs;

bus control logic for selectively coupling at least some of said plurality of second clear register outputs with predetermined reset inputs of said second interrupt state register; and said second clear register being operative to output signals over said bus to clear selected bits within said second interrupt state register in response to the writing of a data word from said processor to said second interrupt clear register.

6. The apparatus of claim 4 further including:

a second clear register having a plurality of inputs in selective electrical communication with said processor and a corresponding plurality of outputs; and said second clear register being operative to generate clear register output signals to reset selected bits within said second interrupt state register in response to the writing of a data word from said processor to said second clear register.

7. A method for rapidly identifying by a processor the source of an interrupt comprising the steps of:

storing indications of at least one interrupt event in a first interrupt state register having a plurality of outputs;

clocking data corresponding to data presented at the outputs of said first interrupt state register into an interrupt vector register with a clock synchronized to a clock for said processor;

providing a first interrupt indication signal to said processor indicative of the storage of data representative of at least one interrupt event in said first interrupt state register;

reading said interrupt vector register by said processor in response to the detection by said processor of said first interrupt indication signal; and testing the contents of said interrupt vector register read by said processor to identify the source of said at least one interrupt event.

8. The method of claim 7 further comprising the step of storing in a processor register the contents of the interrupt vector register read by said processor.

9. The method of claim 8 wherein said testing step includes the step of performing bit test instructions on the contents of processor register to identify the source of said at least one interrupt event.

10. The method of claim 7 wherein said first interrupt state register has a plurality of reset inputs for resetting corresponding bits of said first interrupt state register and said method further includes the steps of:

writing selected clear data from said processor into a first clear register, wherein said first clear register has a plurality of first clear register outputs in electrical communication with a corresponding plurality of reset terminals of said first interrupt state register; and signaling selected ones of said reset terminals of said first interrupt state register to clear predetermined bits of said first interrupt state register in response to the writing of said selected clear data to said first clear register.

11. The method of claim 10 further comprising the steps of:

storing indications of a second set of interrupt events in a second interrupt state register having a plurality of outputs;

providing a second interrupt indication signal to said processor indicative of the storage of data representative of at least one interrupt event in said second interrupt state register; and reading said second interrupt state register by said processor over a bus in response to the detection by said processor of said second interrupt indication signal.

12. The method of claim 11 wherein said second interrupt state register has a plurality of reset inputs for resetting corresponding bits of said second interrupt state register and said method further includes the steps of:

writing selected clear data from said processor into a second clear register; and forwarding said clear data from said second clear register over a bus to selected reset inputs of said second interrupt state register to clear selected bits of said second interrupt state register following the writing of said selected clear data to said second clear register.

13. The method of claim 11 wherein said second interrupt state register has a plurality of reset inputs for resetting corresponding bits of said second interrupt state register and said method further includes the steps of:

writing selected clear data from said processor into a second clear register via a write instruction issued by said processor, wherein said second clear register has a plurality of second clear register outputs in direct electrical communication with a corresponding plurality of said reset inputs of said second interrupt state register; and forwarding said selected clear data from said second clear register directly from said clear register outputs to selected reset inputs of said second interrupt state register to clear selected bits of said second interrupt state register following the writing of said selected clear data to said second clear register.

14. Apparatus for identifying interrupt events comprising:

a first interrupt state register having a first plurality of storage locations for receiving and storing indications of a first plurality of interrupt events, said first interrupt state register having a corresponding plurality of first interrupt state register outputs;

an interrupt vector register having inputs communicatively coupled to said plurality of first interrupt state register outputs, said interrupt vector register having outputs accessible by said processor;

said interrupt vector register clocked by a clock synchronized with said processor so as to reflect the contents of said first interrupt state register, said interrupt vector register outputs being readable by said processor with a first read access latency; and a second interrupt state register having a second plurality of storage locations for receiving and storing indications of a second plurality of interrupt events, said second interrupt state register having a plurality of second interrupt state register outputs, said second interrupt state register outputs being readable by said processor with a second read access latency, wherein said second read access latency is greater than said first read access latency.

* * * * *